US011970002B2

(12) United States Patent
Galliker

(10) Patent No.: US 11,970,002 B2
(45) Date of Patent: Apr. 30, 2024

(54) ELECTRODYNAMIC PRINT HEAD WITH SPLIT SHIELDING ELECTRODES FOR LATERAL INK DEFLECTION

(71) Applicant: Scrona AG, Adliswil (CH)

(72) Inventor: Patrick Galliker, Richterswil (CH)

(73) Assignee: SCRONA AG, Adliswil (CH)

( * ) Notice: Subject to any disclaimer, the term of this patent is extended or adjusted under 35 U.S.C. 154(b) by 122 days.

(21) Appl. No.: 17/775,763

(22) PCT Filed: Nov. 11, 2019

(86) PCT No.: PCT/EP2019/080849

§ 371 (c)(1),
(2) Date: May 10, 2022

(87) PCT Pub. No.: WO2021/093929

PCT Pub. Date: May 20, 2021

(65) Prior Publication Data

US 2022/0410569 A1 Dec. 29, 2022

(51) Int. Cl.
*B41J 2/06* (2006.01)

(52) U.S. Cl.
CPC ............ *B41J 2/06* (2013.01); *B41J 2002/062* (2013.01)

(58) Field of Classification Search
CPC .................... B41J 2/06; B41J 2002/062; B41J 2002/14395; B41J 2202/18; B41J 2/04505; B41J 2/04576; B41J 2/04526; B41J 2/035; B41J 2002/061
See application file for complete search history.

(56) References Cited

U.S. PATENT DOCUMENTS

| | | | |
|---|---|---|---|
| 4,333,086 | A | 6/1982 | Ebi |
| 6,309,050 | B1 | 10/2001 | Ikeda et al. |
| 6,312,110 | B1 | 11/2001 | Darty |
| 7,708,385 | B1 | 5/2010 | Kim et al. |
| 9,061,494 | B2 | 6/2015 | Rogers et al. |
| 2007/0126799 | A1 | 6/2007 | Steiner |
| 2009/0178838 | A1 | 7/2009 | Wang et al. |
| 2009/0179939 | A1 | 7/2009 | Ide et al. |

(Continued)

FOREIGN PATENT DOCUMENTS

| | | | | |
|---|---|---|---|---|
| CN | 101522424 A | | 9/2009 | |
| EP | 2086765 | * | 2/2012 | ............ B41J 2/0095 |

(Continued)

OTHER PUBLICATIONS

International Search Report issued in International Patent Application No. PCT/EP2019/080849, dated Aug. 7, 2020.

(Continued)

*Primary Examiner* — Kristal Feggins
(74) *Attorney, Agent, or Firm* — GREENBLUM & BERNSTEIN, P.L.C.

(57) ABSTRACT

An electrohydrodynamic print head has a plurality of nozzles arranged in a plurality of wells. Extraction electrodes are located around the wells at a level below the nozzles. Further, shielding electrodes are located around the wells at a level below the extraction electrodes. For each well, there are several such shielding electrodes located at (Continued)

different angular positions. This allows to use the shielding electrodes for laterally deflecting the ink after its ejection from the nozzles.

19 Claims, 4 Drawing Sheets

(56) References Cited

U.S. PATENT DOCUMENTS

| | | | | |
|---|---|---|---|---|
| 2010/0045753 | A1 | 2/2010 | Barbet | |
| 2014/0307029 | A1* | 10/2014 | Xie | B41J 2/03 347/47 |
| 2015/0085014 | A1 | 3/2015 | Ishida et al. | |
| 2015/0290938 | A1 | 10/2015 | Rogers et al. | |
| 2018/0009223 | A1* | 1/2018 | Poulikakos | B41J 2/1433 |
| 2018/0104947 | A1 | 4/2018 | Paulikakos et al. | |
| 2019/0344561 | A1 | 11/2019 | Paulikakos et al. | |

FOREIGN PATENT DOCUMENTS

| | | | |
|---|---|---|---|
| JP | S4721637 | U | 10/1972 |
| JP | S 47-21637 | U | 11/1972 |
| JP | 2007/50636 | A | 3/2007 |
| WO | 00/43209 | A1 | 7/2000 |
| WO | 2008/040777 | A1 | 4/2008 |
| WO | 2009/011709 | A1 | 1/2009 |
| WO | 2013/000558 | A1 | 1/2013 |
| WO | 2014/173526 | A2 | 10/2014 |
| WO | 2016/120381 | A1 | 8/2016 |
| WO | 2016/169956 | A1 | 10/2016 |

OTHER PUBLICATIONS

Written Opinion of the International Searching Authority issued in International Patent Application No. PCT/EP2019/080849, dated Aug. 7, 2020.

Office action for the Japanese sibling application, No. 2022-526358 (English language translation), dated Jul. 4, 2023. NOTE: in addition to the two Japanese patent documents cited above, patent document US 2018/0104947-A1 has been cited in Applicant's information disclosure statement of Jul. 27, 2022.

*Note: Regarding the date of the above-referenced document JPS4721637-U, reference is made to the top of the first page of the English language translation, whereby immediately to the right of "JPS4721637U" is "19721110", which has been interpreted as the date "Nov. 10, 1972".

Notification of Second Office action of the China National Property Adminstration for Chinese sibling application No. 201980102140.0 (English language translation), dated Sep. 8, 2023.

Note: In addition to the U.S. patent cited above (7,708,385), the documents JP2007050636A and WO0043209A1 (cited in the aforementioned China Office action) have been made of record in Applicant,s information disclosure statements filed on Aug. 11, 2023 and Jun. 29, 2023, respectively.

English language translation of Notification of the Office Action of family member Chinese Application No. 201980102140.0, dated Jun. 13, 2023.

* cited by examiner

ELECTRODYNAMIC PRINT HEAD WITH SPLIT SHIELDING ELECTRODES FOR LATERAL INK DEFLECTION

TECHNICAL FIELD

The invention relates to an electrohydrodynamic print head and to a method for operating such a print head.

BACKGROUND ART

WO 2016/120381 describes an electrodynamic print head having a plurality of nozzles located in a plurality of wells. Extraction electrodes are located around the wells at a level below said nozzles. They are used to extract ink from the nozzles. In addition, a continuous shielding electrode (shielding layer) can be arranged around the wells at a level below the extraction electrodes. The shielding electrode reduces crosstalk between the nozzles and maintains a homogeneous electric field between the print head and the target. In one embodiment, the extraction electrodes are split into two or three segments, which are operated at slightly different voltages for laterally deflecting the ink.

Disclosure of the Invention

The problem to be solved by the present invention is to provide a print head with good lateral ink deflection as well as a method for operating such a print head.

This problem is solved by the print head and the method of the independent claims.

In particular, the electrohydrodynamic print head comprises at least the following elements:

- A plurality of nozzles: These nozzles are arranged in a plurality of wells of the print head. They can carry ink to be deposited on a target.
- Extraction electrodes located around the wells at a level below said nozzles: The extraction electrodes are used to extract ink from the nozzles by applying a suitable voltage in respect to the ink.
- Shielding electrodes located around the wells at a level below the extraction electrodes: In contrast to the prior art, there are, for each well, several shielding electrodes located at different angular positions adjacent to the well. This allows to generate a lateral deflection of the ink extracted by means of the extraction electrodes.

The expression “located at different angular positions around the well” means that there is at least one shielding electrode located at a first horizontal angular direction as seen from the central axis of the well and another shielding electrode arranged at another horizontal angular direction. The two shielding electrodes are capable to carry different potentials in order to laterally deflect the ink, i.e. they are advantageously electrically insulated from each other.

The expression “for each well” indicates that the wells and nozzles the claims refer to are those wells and nozzles that have several shielding electrodes for lateral deflection of the ink. There may be “other” wells and nozzles on the print head without several such shielding electrodes arranged around them, i.e. nozzles and wells without such a lateral deflection functionality. The claims do not rule out that, in addition to the nozzles with lateral deflection capability, there may be other nozzles on the print head that do not have this capability.

The invention is based on the understanding that the prior art solution of segmenting the extraction electrodes leads to various problems. For one, it necessitates to feed several voltages to each nozzle and, since the nozzles are to be operated individually, complex wiring is required within the print head in order to generate at least three independent potentials at each nozzle. In contrast to this, if the lateral ink deflection is separated from ink extraction, the wiring can be simpler because, often, the deflection can be the same for a large number of nozzles.

In addition, using the shielding electrodes for deflection is more efficient because they shape the electric field in a large volume, basically in the region between the shielding electrodes and the target, at least within a distance that is equivalent to the distance between two nozzles. In contrast to this, the reach of the extraction electrodes is basically limited to the small volume of the well.

Finally, in WO 2016/120381, the aperture of the deflection is limited by the diameter-to-depth ratio of the wells. In addition, a lateral asymmetry in the electrical field used for extracting the ink can strongly affect the shape of the meniscus at the nozzle and lead to lateral droplet extraction, which makes it even more likely that ink hits the wall of the well, which can lead to a flooding of the well.

Advantageously, the shielding electrodes cover at least 90% of a circumference of each well, i.e. they cover all or most of the circumference of the well in order to shield the field of the extraction electrode.

In one embodiment, the print head has several subsets of shielding electrodes, with each subset comprising several electrically interconnected shielding electrodes located at different wells. In other words, the shielding electrodes of a subset can be supplied with a single voltage, which simplifies the wiring of the print head.

In particular, there may be at least a first subset-type of shielding electrodes. The shielding electrodes of each set of the first subset-type are interconnected to each other by interconnect lines located at the vertical level of the shielding electrodes, i.e. the electrodes of this subset-type are directly interconnected on the shielding electrode layer.

There may be at least two subsets of the first subset-type, with a row of said wells being arranged between the shielding electrodes of the two subsets.

There may also be at least one second subset-type of shielding electrodes, wherein the shielding electrodes of each set of the second subset-type are interconnected to each other by means of vias to interconnect lines located on a vertical level above the shielding electrodes. In this case, the interconnections between the shielding electrodes are spatially separated from the level of the shielding electrodes, which simplifies the design of the layer forming the shielding electrodes. This is particularly advantageous in combination with a first subset as mentioned above because the wiring of the two subset-types can be spatially separated.

There may be at least two subsets of the second subset-type, with a row of said wells being arranged between the shielding electrodes of the two subsets.

The print head may further comprise a plurality of ventilation openings including blow openings and suction openings. They are adapted to blow gas into the space below the shielding electrodes and to suck gas from said space, thereby ventilating the space for improved ink drying.

In that case, the shielding electrodes can be used to compensate for lateral gas flows generated between the blow openings and the suction openings.

In one embodiment, the print head may have a regular matrix of nozzles and ventilation openings. Within this matrix, each nozzle is arranged at the center of two suction openings and two blow openings and each ventilation opening is arranged at the center of four nozzles. In this case, the gas flows around two adjacent nozzles are reversed with respect to each other, i.e. there is an alternating pattern of gas flows.

In order to compensate for such or similar alternating patterns of gas flows, there may be at least a subset A of interconnected shielding electrodes and a subset B of interconnected shielding electrodes. Along a row of nozzles, and under a given angular position from the wells of this row, the shielding electrodes of the subset A are alternating with the shielding electrodes of the subset B. This allows to feed different potentials to alternating nozzles and to tune the electrostatic deflection to the alternating flow pattern.

The method for operating the print head comprises the step of applying different electrical potentials to at least some of the shielding electrodes located at different angular positions adjacent to the same well while ink is being ejected from the nozzle in said well. This generates a lateral deflection of the ink.

In one embodiment, the method may include the following steps:

- Mechanically moving the print head with respect to a target below it along a direction A.
- Deflecting the ink, using the shielding electrodes, in a direction B: This direction B extends transversally, in particular perpendicularly, to the direction A.

This makes it possible to displace the print head (or target) mechanically along one direction while scanning the other direction by means of the electrostatic deflection.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Definitions

Figure 1:
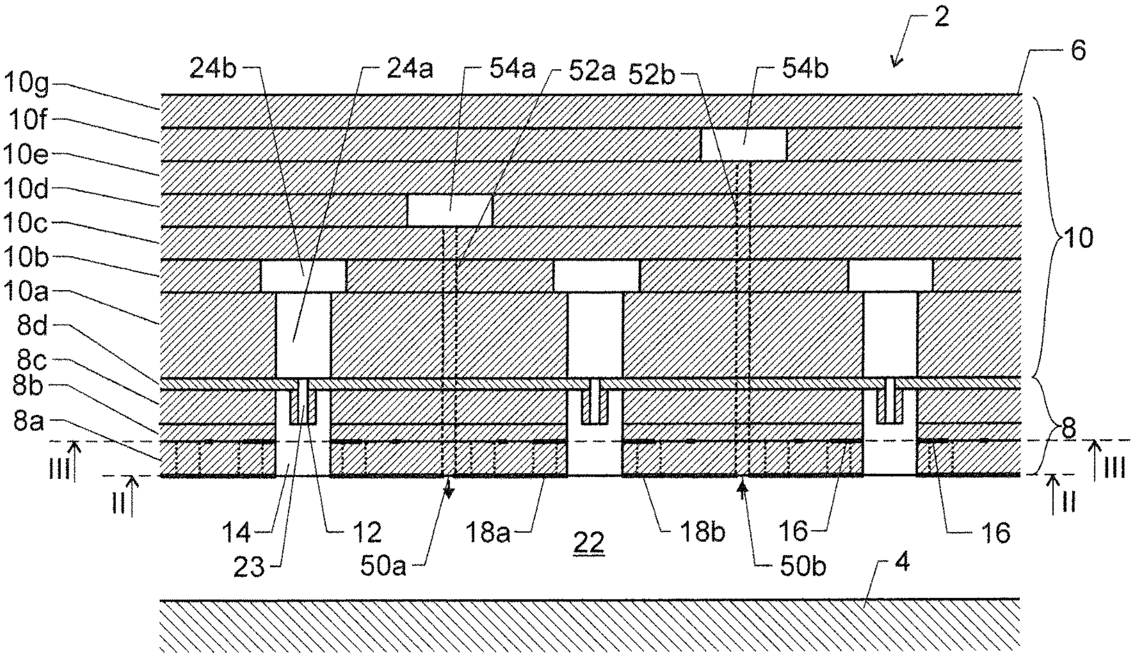
FIG. 1 shows a sectional view of a print head along line I-I of FIG. 2.

Terms such as above, below, top, bottom are to be understood such that the nozzle is arranged at a level above the extraction electrodes, and the shielding electrodes are arranged at a level below the extraction electrodes. Advantageously, the axial direction of the nozzles is considered to define the vertical direction.

Horizontal and lateral designates directions perpendicular to the vertical direction.

A dielectric is a material having an electrical conductivity of $10^{-6}$ S/m or less.

Print Head Design:

FIGS. 1-4 show a first embodiment of a print head 2 for printing ink on a target 4.

It comprises a main body 6 with a plurality of structured layers. In particular, main body 6 comprises a nozzle layer 8 and a feed layer 10, with nozzle layer 8 being arranged, by definition, below feed layer 10.

Nozzle layer 8 farms a plurality of nozzles 12. Each nozzle 12 is arranged in a well 14, namely at a top end of well 14.

An ejection electrode 16 is provided for each nozzle 12 at a vertical level below nozzle 12. It is structured to electrohydrodynamically extract ink from nozzle 12 and accelerate it towards target 4 below.

Figure 3:
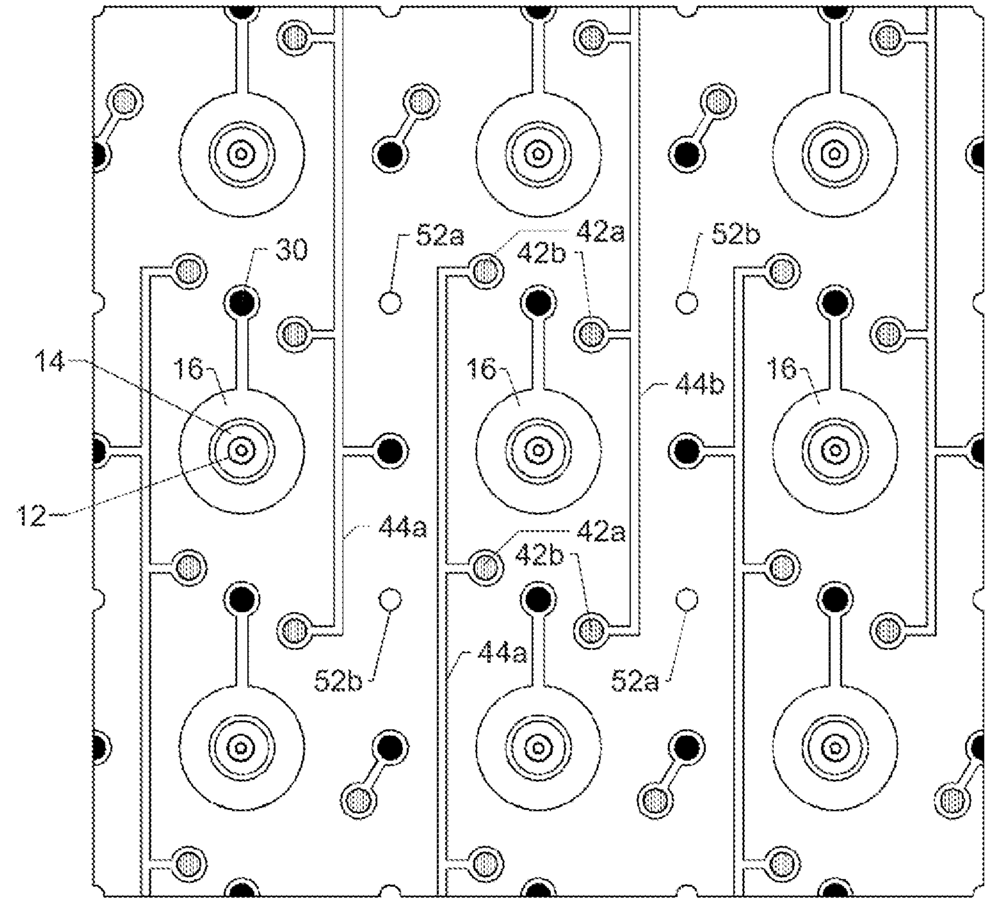
FIG. 3 shows a view along line of FIG. 1.

Ejection electrode 16 is advantageously arranged, at least in part, around a well 14 and may in particular be annular, as shown in FIG. 3.

A plurality of shielding electrodes 18*a*-18*d* are arranged at a bottom of nozzle layer 8 at a vertical level below the ejection electrodes 16. These shielding electrodes are used to reduce crosstalk between the nozzles 12, but they are also designed to laterally deflect the ink as it passes the space 22 between print head 2 and target 4. They are described in more detail in the next sections.

Nozzle layer 8 comprises a plurality of sublayers. In the present embodiment, these include:

- A first sublayer 8*a* forming a bottom section of the wells 14.
- A second sublayer 8*b* located above first sublayer 8*a* and forming a middle section of the wells 14.
- A third sublayer 8*c* located above second sublayer 8*b* and forming a top section of the wells 14 as well as the walls of the nozzles 12.
- A fourth sublayer 8*d* arranged above third sublayer 8*c* and forming a plate carrying the nozzles 12 at the centers of their respective wells 14.

The sublayers 8*a*-8*d* are advantageously dielectric layers, such as layers of inorganic material like silicon dioxide, silicon nitride, silicon oxynitride, or of organic materials like SU8 or BCB (Benzocyclobutene).

Each nozzle 12 forms a channel 23 extending between a bottomside opening of the nozzle and feed layer 10.

Nozzle layer 8 may have the same structure at a majority of all nozzles 12 or even at all of them. It may e.g. be mass-produced at a semiconductor foundry using known anisotropic etching and semiconductor patterning technologies.

Feed layer 10 is e.g. designed as an interposer layer as known from semiconductor manufacturing and it comprises a plurality of ink ducts 24*a*, 24*b* extending through it for feeding ink to the nozzles 12.

In the shown embodiment, the ink ducts comprise via sections 24*a*, with each via section extending upwards from a nozzle 12 into feed layer 10, where it is connected to an interconnect section 24*b*. The interconnect sections 24*b* extend horizontally and interconnect several via sections 24*a*, and they are in turn connected to one or more ink terminals 26 (FIG. 4) of print head 2, optionally through further vertical via sections and/or horizontal interconnect sections. At the ink terminals 26, the ink ducts are connected to one or more ink reservoirs 28, directly or by means of additional ducts.

Figure 4:
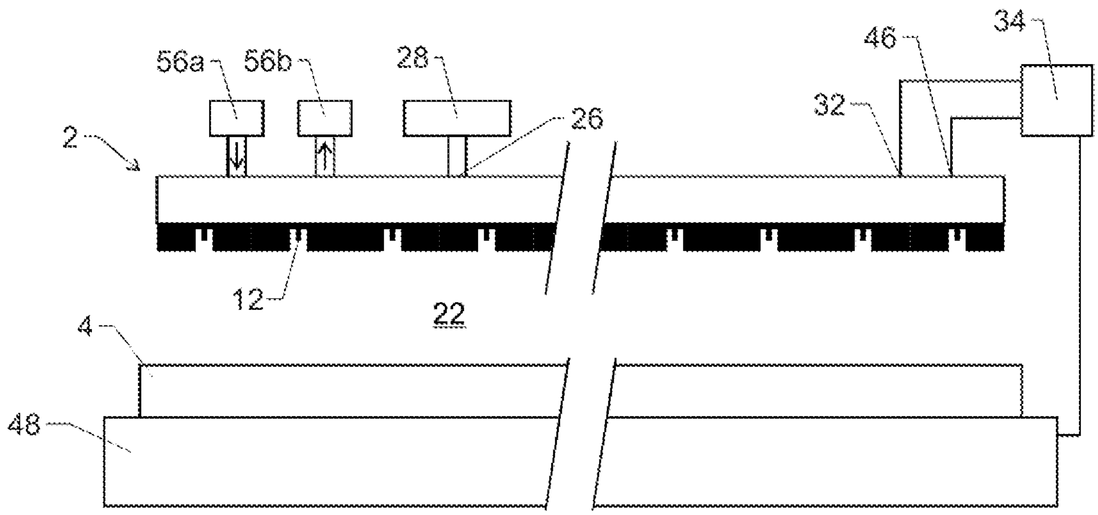
FIG. 4 shows components of a printer.

As can be seen from FIG. 3, the ejection electrodes 16 may be connected, by means of electrical tracks, to one or more electrical vias 30, which extend upwards into feed layer 10 (not shown in FIG. 1), where they are suitably wired to ejection electrode terminals 32 (FIG. 4).

A control unit 34 as shown in FIG. 4 is provided for generating voltage pulses, i.e. voltage pulses between the ejection electrodes 16 and the ink in the nozzles 12, in order to eject ink from the nozzles 12. Advantageously, the voltages of the individual nozzles 12 can be controlled individually or in small groups (with each group containing no more than e.g. 1/100 of all nozzles 12).

FIG. 1 shows feed layer 10 to comprise a sublayer 10*a*, which is advantageously a dielectric layer and which forms the via sections 24*a* of the ink ducts. Feed layer 6 may comprise further sublayers, e.g. the layers 10*b*-10*g* of FIG. 1, e.g. for forming further ink duct sections and/or electrical tracks and/or ventilation ducts as described for some of the embodiments below.

Feed layer 10 can be used for customizing the function of the nozzles 12, e.g. for disabling some of them, e.g. by blocking or interconnecting the ink ducts to some of them and/or the electrical connections to their ejection electrodes 16.

Shielding Electrodes, 1st Embodiment

Figure 2:
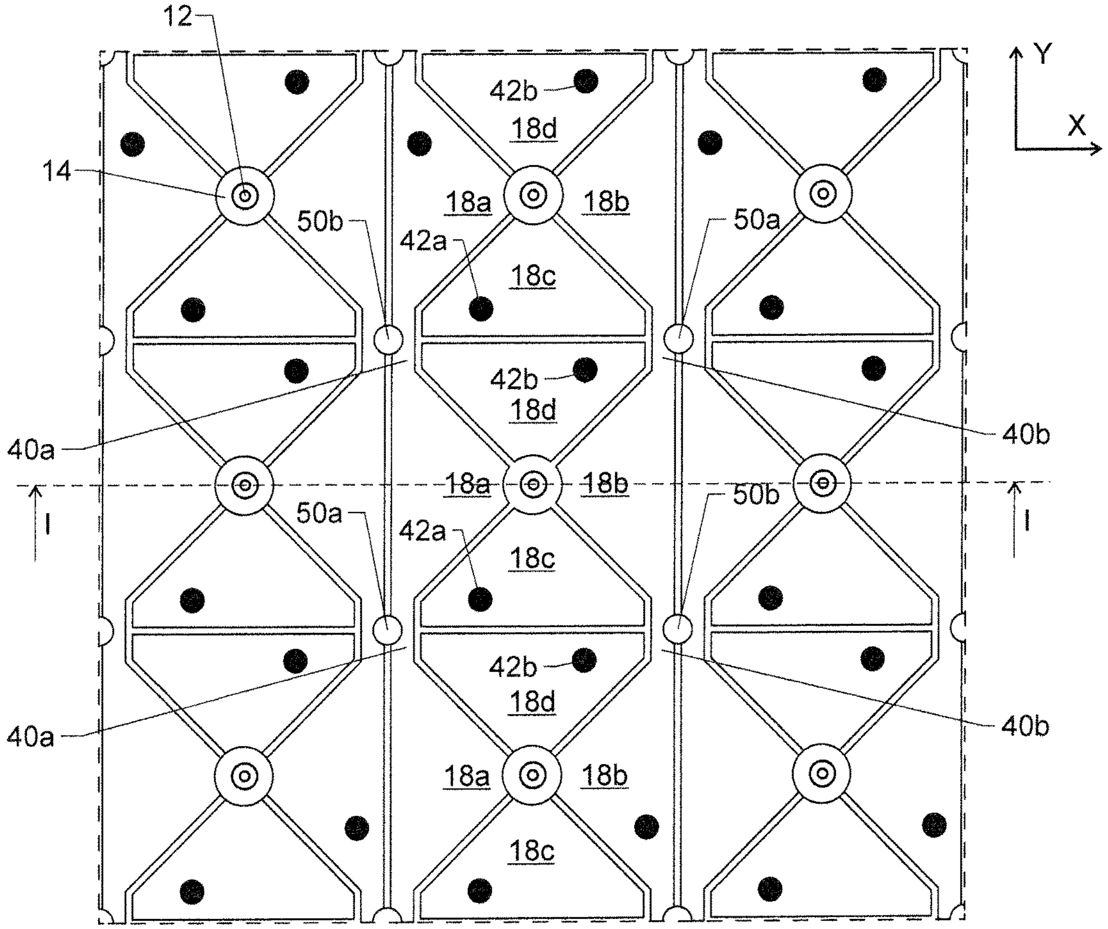
FIG. 2 shows a view along line II-II of FIG. 1.

The design of the shielding electrodes 18*a*-18*d* is best seen in FIGS. 1 and 2.

In the shown embodiment there are four shielding electrodes 18*a*-18*d* located at different angular positions around and below each well 14, with each of them belonging to a different subset of shielding electrodes.

For each well 14, there is a shielding electrode 18*a* located at angular position −X from the well, a shielding electrode 18*b* located at angular position +X from the well, a shielding electrode 18*c* located at angular position −Y from the well, and a shielding electrode 18*d* located at angular position +Y from the well.

The shielding electrodes 18*a* form a subset of electrically interconnected shielding electrodes. Similarly, the shielding electrodes 18*b*, 18*c*, and 18*d* form their own subsets, with the various subsets being mutually insulated.

The subset formed by the shielding electrodes 18*a* is a subset of a “first subset-type”. In a subset of this first subset-type, the shielding electrodes 18*a* are connected by interconnect lines 40*a* located at the vertical level of the shielding electrodes 18*a* that they are connecting, i.e. at the bottom side of first sublayer 8*a*.

Similarly, the subset formed by the shielding electrodes 18*b* is a subset of this first subset-type because they are interconnected by interconnect lines 40*b* located at the same level as the electrodes 18*b*.

The subset formed by the shielding electrodes 18*c* is a subset of a “second subset-type”. In a set of this second subset-type, the shielding electrodes 18*c* are connected by means of vias 42*a* to interconnect lines 44*a* located on a vertical level above the shielding electrodes 18*c* (cf. FIG. 3).

Similarly, the subset formed by the shielding electrodes 18*d* is a subset of this second subset-type because they are interconnected by means of vias 42*b* to interconnect lines 44*b* located on a vertical level above the shielding electrodes 18*d*.

As shown in FIG. 3, the interconnect lines 42*a*, 42*b* are advantageously located at the vertical level of the ejection electrodes 16, using the space and structured metal layer at this level. This level is e.g. located at the top of first sublayer 8*a*.

The assembly of the shielding electrodes 18*a*-18*d* into subsets of interconnected electrodes allows to control a plurality of shielding electrodes with the same voltage and simplifies the wiring required in feed layer 10.

The assembly of the shielding electrodes 18*a*-18*d* into subsets of the first and the second subset-type simplifies the horizontal wiring for interconnecting the shielding electrodes of a given subset.

As can be seen in FIG. 2, a row of wells 14 and nozzles 12 is located between the subsets of the shielding electrodes 18*a*, 18*b*. Hence, generating a voltage differential across the electrodes 18*a*, 1*b* of these two subsets allows to laterally defleet, along direction X, the ink ejected at all these nozzles in the same manner.

Similarly, a row of wells 14 and nozzles 12 is located between the subsets of the shielding electrodes 18*c*, 18*d*. Hence, generating a voltage differential across the electrodes 18*e*, 18*d* of these two subsets allows to laterally deflect, along direction Y, the ink ejected at all these nozzles in the same manner.

Each subset of shielding electrodes is connected, by means of electrical tracks extending through at least some the layers of the print head, to a deflection terminal, one of which is shown under reference number 46 in FIG. 4. The deflection terminals 46 of the various subsets are connected to control unit 34 for controlling their voltages.

Similarly, control unit 34 is connected to target 4 or a substrate 48 of target 4, for controlling the electrical field in space 22 between print head 2 and target 4 (cf. FIG. 4).

In the embodiment of FIG. 2, there are exactly four shielding electrodes 18*a*-18*d* located adjacent to each well 14 and nozzle 12.

In more general terms, at least part of the wells 14 may have exactly four shielding electrodes 18*a*-18*d* located adjacent to the well 14.

Shielding Electrodes, 2nd Embodiment

Figure 5:
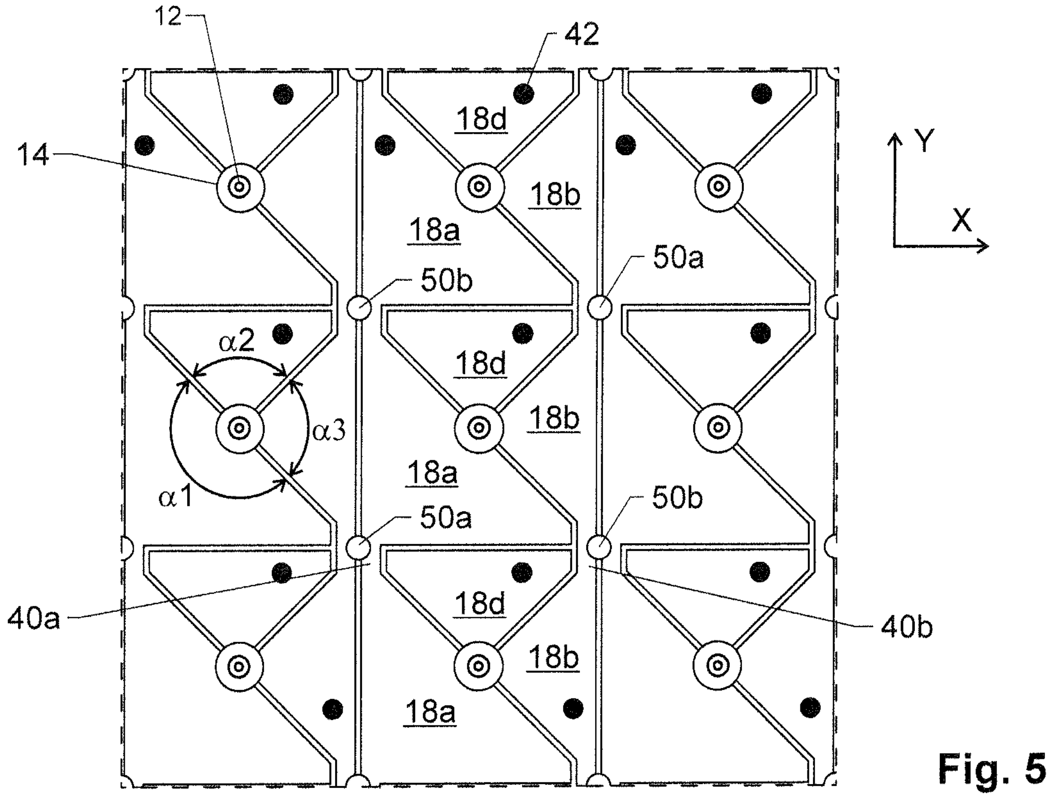
FIG. 5 shows a second embodiment of the shielding electrodes, corresponding to the view of FIG. 2.

It is not strictly necessary to have four shielding electrodes 18*a*-18*d* adjacent to each well 14 and nozzle 12. In the embodiment of FIG. 5, there are, for each well 14 and nozzle 12, only three shielding electrodes 18*a*, 18*b*, 18*d*.

Hence, in this embodiment, at least part of the wells 14 have exactly three shielding electrodes 18*a*, 18*b*, 18*d* located adjacent to the well 14.

When comparing FIG. 5 to FIG. 2, it can be seen that two neighboring shielding electrodes (namely the electrodes 18*a*, 18*c* of FIG. 2) have been assembled into a single shielding electrode (namely the electrode 18*a* of FIG. 2). This embodiment still allows to deflect the ink in direction X (by having a voltage drop across the shielding electrodes 18*a*, 18*b*) as well as in direction Y (by having a voltage drop across the shielding electrodes 18*a*, 18*d*).

In the shown embodiment, the shielding electrodes 18*a* fort a sub-set of the first subset-type and so do the shielding electrodes 18*b*, i.e. both these sub-sets are interconnected by interconnect lines 40*a*, 40*b* on the same vertical levels as the shielding electrodes 18*a*, 18*b* themselves. On the other hand, the shielding electrodes 18*d* form a subset of the second subset-type, i.e. they are interconnected by vias 42 connected to interconnect tines (similar to the interconnect lines in 44*a* of FIG. 3) in a level above the shielding electrodes 18*d*.

Advantageously, when there are only three shielding electrodes per well 14 and nozzle 12, one of the shielding electrodes, namely shielding electrode 18*a* in the shown embodiment, forms a reference electrode and is the largest electrode, while the other two shielding electrodes, namely electrodes 18*b* and 18*d* in the shown embodiment, form counter-electrodes and are smaller.

In particular, the reference electrode extends around 180°±20° of the well 14 and nozzle 12 (see angle $\alpha 1$ of FIG. 5), while the counter-electrodes each extend around 90°±20° of the well 14 and nozzle 12 (see angles $\alpha 2$ and $\alpha 3$ of FIG. 5).

In this way, the electric field generated between all three electrodes can be regarded as a superposition of a x-deflecting field and a y-deflecting field, originating from the voltage applied between reference electrode 18*a* and electrode 18*b*, and from the voltage applied between reference electrode 18*a* and electrode 18*d*, respectively. However, it is of course possible to form other electrode shapes, e.g. three electrodes of equal size distributed around the well, advantageously with each electrode extending around 120°±20° of the well 14 and nozzle 12. In this case, however, it may be more difficult to evaluate a certain x-y-deflection value from the voltages applied to the different electrodes.

Shielding Electrodes, 3rd Embodiment

Figure 6:
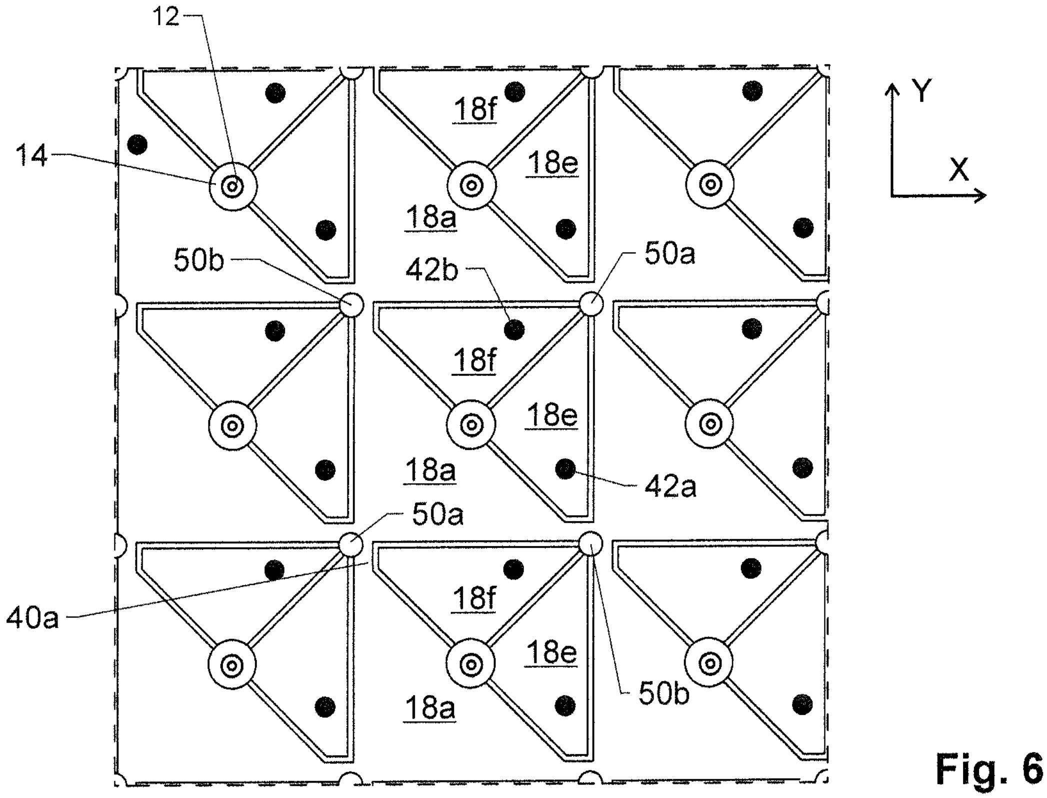
FIG. 6 shows a third embodiment of the shielding electrodes, corresponding to the view of FIG. 2.

FIG. 6 shows yet another embodiment with only three shielding electrodes 18*a*, 18*e*, 18*f* located at each well 14 and nozzle 12.

In contrast to the second embodiment, however, there are two subsets of the second subset-type, with one of these subsets being foamed by the shielding electrodes 18*e* and the other of these subsets being formed by the shielding electrodes 18*f*.

On the other hand, only the shielding electrodes 18*a* belong to a subset of the first subset-type (even though they may also belong to a subset of the second subset-type).

Ventilation Openings:

The print head 2 may comprise a plurality of ventilation openings 50*a*, 50*b*. These include blow openings 50*a* and suction openings 50*b*.

The blow openings 50*a* are adapted to blow gas into space 22, and the suction openings 50*b* are adapted to suck gas from space 22, thereby ventilating space 22 for improved ink drying.

As shown in FIG. 1, the ventilation openings 50*a*, 50*b* are connected to ventilation ducts 52*a*, 52*b*, 54*a*, 54*b* of print head 2, which are in turn connected to a ventilation source 56*a* and a ventilation sink 56*b* (cf. FIG. 4).

Ventilation source 56*a* is adapted to blow a gas through the ventilation ducts 52*a*, 54*a* to the blow openings 50*a*. Ventilation sink 56*b* is adapted to suck gas from the suction openings 50*b* through the ventilation ducts 52*b*, 54*b*.

In one embodiment, all blow openings 50*a* are connected to the same ventilation source 56*a*, and all suction openings 50*b* are connected to the same ventilation sink 56*b*.

In a compact embodiment, where at least some of the nozzles 12 and ventilation openings 50*a*, 50*b* are arranged in a regular two-dimensional matrix as e.g. shown in FIG. 2, with nozzles extending regularly e.g. along the directions X and Y, respectively, each nozzle 12 is arranged at the center of two blow openings 50*a* and two suction openings 50*b* and each ventilation opening 50*a*, 50*b* is arranged at the center of four nozzles 12.

Figure 7:
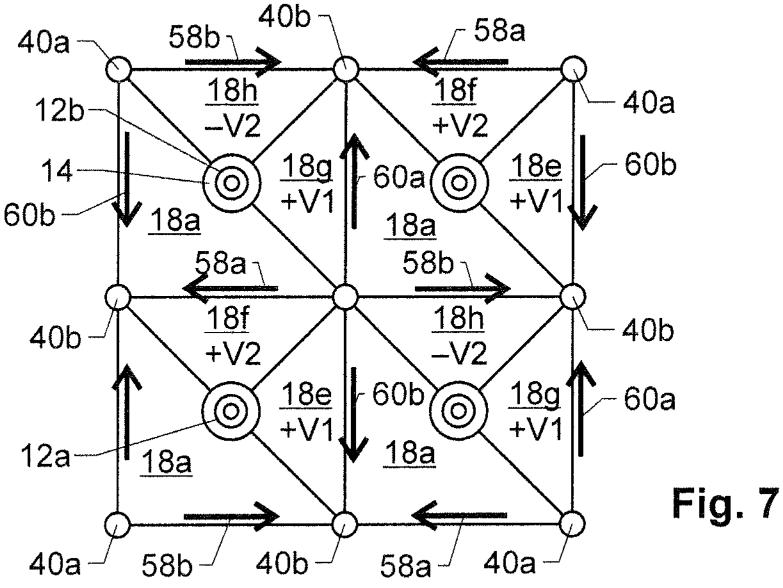
FIG. 7 illustrates a design for compensating alternating ventilation.

In that case, an alternating flow pattern as illustrated by the arrows 58*a*, 58*b*, 60*a*, 60*b* in FIG. 7 is created. Namely, the flow pattern will alternate between adjacent nozzles 12.

Irrespective of the flow direction, the velocity at the nozzle axis becomes zero, which means that the trajectory of droplets that are not actively deflected will not be affected by the alternating flow pattern. However, when deflecting the ink by means of the shielding electrodes, the droplets enter into a non-zero flow field, which can lead to asymmetries in the flight trajectory that may have to be compensated.

For example, in the embodiment of FIG. 7, let us assume that we want to deflect the ink from all nozzles 12 along direction X by the same amount and not along direction Y. To achieve this, we have to apply a voltage V1 across the nozzles along direction X. If we do so, the droplets ejected from nozzle 12*a* will experience drag from an air flow corresponding to arrow 60*b* along direction −Y while the ink from nozzle 12*b* would experience drag from an oppositely directed air flow corresponding to arrow 60*a* along direction +Y.

To compensate for that, alternating auxiliary voltages V2 and −V2 can be applied along direction Y across the wells 14.

To be able to apply such alternating auxiliary voltages V2 and −V2, there should at least be a subset A of shielding electrodes 18*f* and a subset B of shielding electrodes 18*h*. Along a row of nozzles (namely a row extending along direction Y of FIG. 7), when looking at the angular position Y as seen from the wells 14, the shielding electrodes 18*f* and 18*h* of the two subsets A and B should alternate.

In other words, FIG. 7, when looking at the shielding electrodes lying in angular position Y from each well, these shielding electrodes are alternatingly is shielding electrodes 18*f* and 18*h*.

If it is desired to not only deflect the ink into direction X but also into direction Y, the shielding electrodes at the right of the wells 14 of FIG. 7 (i.e. those at angular position +X) should alternate between two subsets A and B as well, as indicated by there being two subsets 18*e* and 18*g* alternating with each other along direction X.

Method of Operation:

In order to deflect the inks along the horizontal directions X and/or Y, different electrical potentials can be applied to the shielding electrodes located at different angular positions adjacent to some or all of the wells.

Typical voltages applied to the various electrodes are e.g. a combination of one or more of the following:

- The voltage applied between the ink in the nozzle and the ejection electrode is, for ejection, e.g. in the range of 100V to 500V.
- The voltage applied between the ink in the nozzle and the shielding electrodes is typically in the same range as that applied at the ejection electrode, although the voltage may both be higher or lower than that applied at the ejection electrode.
- Absolute voltages applied to shielding electrodes on opposite sides of a nozzle are, for maximum deflection, typically between 10V and 100V.

Figure 8:
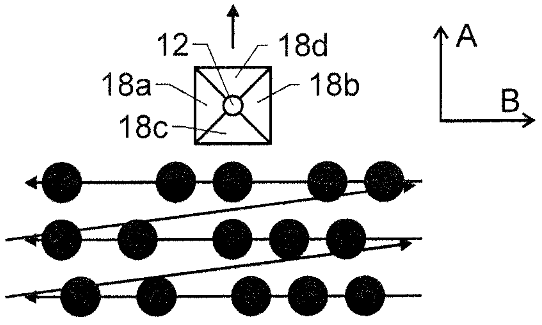
FIG. 8 shows a first application of the deflection technology.

Fast Deflection:

One important application is depicted in FIG. 8. Here, the print head (represented by a single nozzle 12 and its surrounding shielding electrodes 18*a*-18*d*) is mechanically moved, in respect to the target, along a horizontal direction A while ejecting ink.

At the same time, the ink is deflected by means of the shielding electrodes in a direction B, which is perpendicular (or transversal) to direction A.

Hence, it becomes possible to print at positions that are not directly below nozzle 12.

Advantageously, the lateral displacement velocity of the ink position on the target in direction B by means of the electrostatic deflection is faster than the lateral displacement of the ink position on the target in direction A by means of mechanical displacement, in particular at least 10 times faster. This allows to generate a high resolution print along both directions without fast mechanical displacements.

This technique allows to move print head 2 without acceleration (or without large acceleration) along A while the point of impact oscillates along direction B.

If print head 2 moves steadily along direction A and it is desired to generate series of dots exactly along direction B, i.e. a direction exactly perpendicular to A, as shown in FIG. 7, the shielding electrodes arranged across the nozzle along direction B (i.e. the electrodes 18*a*, 18*b* in the shown example) can be used for the lateral deflection along direction B while the shielding electrodes arranged across the nozzle along direction A (i.e. the electrodes 18*c* and 18*d* in the shown example) can be used to compensate for the continuous forward movement of print head 2 along direction A.

Advantageously, the voltages along directions A and B would be sawtooth-shapes voltages, i.e. each of them changes from a first voltage to a second voltage, in particular continuously, during a first time interval T1, and then goes back to the first voltage in a second time interval T2, with T1>>T2, in particular T1>10·T2.

It must be noted that, in order to implement the technique of FIG. 8, a print head with only three shielding electrodes, such as the one of FIG. 6, can be used as well.

Alignment Correction:

In certain situations it can be beneficial that not all nozzles on the print head are individually controllable, but instead the ejection electrodes 16 of some nozzles may be interconnected and are therefore ejecting droplets always at the same time. Print heads with such characteristics can be used if a regular structure 64 is to be printed. In this case, the interconnected nozzles 12 on the print head may be arranged in reference to a regular structure 64 that needs to be printed on. When initialing printing, the number of interconnected nozzles 12 will define the number of regular structures 64 that is printed on at the same time. However, when doing so, one implies that the reference spacing S between neighboring nozzles 12 is exactly the same as the spacings S' defining the regular structure 64. Due to various reasons, these distances may be different though, so another application of deflection by means of the shielding electrodes is depicted in FIG. 9, where the deflection is used to correct for registration mismatches between the nozzles 12 and the regular structures 64.

Figure 9:
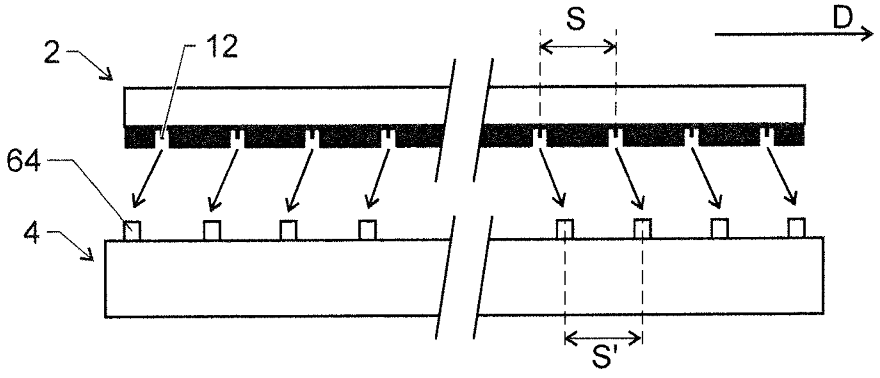
FIG. 9 shows a second application of the deflection technology.

For example, print head 2 is supposed to print onto a regular structure 64 contained on substrate 4 with a spacing S' along direction D while it is moving in a horizontal forward direction perpendicular to D, i.e. in a direction perpendicular to the plane of FIG. 9. Spacing S' of the structure 64 is, however, not a multiple integer of spacing S, i.e. in a conventional print head it would be necessary to displace the print head laterally not only along its forward direction but also along direction D in order to print accurately on all structures 64, which would not only require additional mechanical movement but also reduce the printing speed substantially.

However, if the shielding electrodes are used to laterally deflect the ink (i.e. along direction D), this can be achieved without laterally displacing print head 2 along direction D.

In order to print structure 64, the component of the electric field along direction D is statically varied along direction D in order to match the spacing of the positions of impact of the ink on target 4 with the spacing S'.

In the example of FIG. 9, spacing S' is somewhat larger than spacing S. Hence, the ink needs to be spread along D by deflecting the ink from the leftmost nozzles 12 slightly to the left and from the rightmost nozzles 12 slightly to the right.

This is particularly important when the print head has a large extension along direction D. In that case, different temperatures at print head 2 and target 4 combined with different thermal dilatations of print head 2 and target 4 may affect the spacings S and S' differently. Hence, even if at one set of temperatures, the spacing S and S' were matched perfectly, a change of temperature would lead to a mismatch.

For example, the centermost nozzles 12 of print head 2 may be well-aligned over the structure 64. In that case, ink of the outermost nozzles 12 will need a lateral correction.

Hence, along direction D, there are advantageously several different subsets of shielding electrodes, which allows to apply a different voltage differential over the nozzles at the center and those further away (along direction D) from the center, thereby adapting the deflection along direction D.

In some cases, it may e.g. be sufficient to use the same voltage differential over e.g. all electrodes within a region of 10 mm. If the printing head has an to extension, along D, of e.g. 30 mm, three regions of different subsets may in that case suffice.

The correction depicted in FIG. 9 can also be used in both horizontal directions, i.e. also along the horizontal direction perpendicular to direction D.

Notes:

In the embodiments above, there is at least one subset of shielding electrodes of the first subset-type, i.e. they are connected by interconnect lines located on the same vertical level as the shielding electrodes themselves. Alternatively, though, there may only be subsets of shielding electrodes of the second subset-type, i.e. there are no interconnect lines 40*a*, 40*b* on the level of the shielding electrodes 18*a*-18*f*. Rather, all shielding electrodes 18*a*-18*f* are connected to vias (such as the vias 42*a*, 42*b*) and to interconnect lines (such as lines 44*a*, 44*b* of FIG. 3) on a vertical level above the shielding electrodes 18*a*-18*f*. This allows to generate a shielding electrode pattern of higher symmetry.

In the embodiments above, there are three or four shielding electrodes at each nozzle 12 and well 14. If deflection only along one direction is desired (such as direction D of the application of FIG. 9) and no venting compensation of the type illustrated in FIG. 7 is desired, it may be sufficient to have only two shielding electrodes located adjacent to said well.

As already mentioned, the shielding electrodes should cover a large percentage of the area around each well 14, e.g. at least 90% of its circumference, in order to shield the field of the ejection electrode 16 and prevent crosstalk between neighboring nozzles 12.

As mentioned above, the shielding electrodes of a given subset can be interconnected at the vertical level of the electrodes or at the vertical level of the ejection electrodes. However, in particular if the subsets have a more complex geometry, such as the one shown in FIG. 7, a further interconnection layer can be introduced, e.g. by splitting first sublayer 8*a* into two sub-sublayers and arranging at least some of the interconnect lines between the two sub-sublayers (with vias connecting them to the shielding electrodes).

While there are shown and described presently preferred embodiments of the invention, it is to be distinctly understood that the invention is not limited thereto but may be otherwise variously embodied and practiced within the scope of the following claims.

The invention claimed is:

1. An electrohydrodynamic print head comprising
a plurality of nozzles arranged in a plurality of wells,
extraction electrodes located around said wells at a level below said nozzles,
shielding electrodes located around said wells at a level below said extraction electrodes,
wherein, there are, for each well, several shielding electrodes located at different angular positions adjacent to said well.

2. The print head of claim 1 wherein said shielding electrodes cover at least 90% of a circumference of each well.

3. The print head of claim 1 having several subsets of shielding electrodes, with each subset comprising several electrically interconnected shielding electrodes located at different wells.

4. The print head of claim 3 having at least a first subset-type of shielding electrodes, wherein the shielding electrodes of each set of the first subset-type are connected by interconnect lines located at a vertical level of the shielding electrodes.

5. The print head of claim 4 having at least two subsets of the first subset-type, with a row of said wells being arranged between the shielding electrodes of the two subsets.

6. The print head of claim 5 having at least two subsets of the second subset-type, with a row of said wells being arranged between the shielding electrodes of the two subsets.

7. The print head of claim 3 having at least a second subset-type of shielding electrodes, wherein the shielding electrodes of each set of the second subset-type are connected by vias to interconnect lines located on a vertical level above the shielding electrodes.

8. The print head of claim 7 wherein the ejection electrodes are located at the same vertical level as said interconnect lines.

9. The print head of claim 1 wherein
at least part of said wells have exactly two shielding electrodes located adjacent to said well.

10. The print head of claim 1 comprising a plurality of ventilation openings including blow openings and suction openings.

11. The print head of claim 10 having a regular matrix of nozzles and ventilation openings, wherein, within said matrix, each nozzle is arranged at the center of two suction openings and two blow openings and each ventilation opening is arranged at the center of four nozzles.

12. The print head of claim 10, wherein there is at least a subset A of shielding electrodes and a subset B of shielding electrodes wherein, along a row of nozzles, at a given angular position from said wells, the shielding electrodes of the subset A alternate with the shielding electrodes of the subset B.

13. The print head of claim 1 wherein each shielding electrode covers an angular range of at least 80° around the well.

14. A method for operating the print head of claim 1 for printing on a target, wherein said method comprises applying different electrical potentials to at least some of the shielding electrodes located at different angular positions adjacent to the same well while ink is being ejected from the nozzle in the well.

15. The method of claim 14 comprising
mechanically moving said print head with respect to the target below said print head along a direction A, and
deflecting ink, using said shielding electrodes, in a direction B, wherein said direction B extends transversally to said direction A.

16. The method of claim 14, wherein the print head has, in a given direction, a spacing S between neighboring nozzles, and wherein for printing a regular structure with a spacing S' along said given direction on the target, wherein said spacing S' is not equal to or an integer multiple of said spacing S, said method comprises
spatially varying, along said given direction, a lateral component of an electrical field generated by said shielding electrodes, to match the spacing of the positions of impact of said ink on said target with the spacing S'.

17. The print head of claim 1 wherein at least part of said wells have exactly three shielding electrodes located adjacent to said well.

18. The print head of claim 17 wherein one of the three shielding electrodes is a reference electrode extending around an angle of 180°+/−20° of the well while the other two electrodes are counter-electrodes each extending around angles of 90°+/−20° of the well.

19. The print head of claim 1 wherein at least part of said wells have exactly tour shielding, electrodes located adjacent to said well.

* * * * *